(12) United States Patent
Song

(10) Patent No.: US 6,949,134 B2
(45) Date of Patent: Sep. 27, 2005

(54) VACUUM CLEANER

(75) Inventor: Young-So Song, Seoul (KR)

(73) Assignee: Conet Industries, Inc., Seoul (KR)

( * ) Notice: Subject to any disclaimer, the term of this patent is extended or adjusted under 35 U.S.C. 154(b) by 357 days.

(21) Appl. No.: 10/320,341

(22) Filed: Dec. 16, 2002

(65) Prior Publication Data

US 2004/0083572 A1 May 6, 2004

(30) Foreign Application Priority Data

Nov. 6, 2002 (KR) .................................. 10-2002-0068418

(51) Int. Cl.$^7$ ......................... B01D 35/30; B01D 53/02
(52) U.S. Cl. ........................... 96/134; 96/382; 55/337; 55/414; 55/482; 55/486; 55/489; 55/467; 55/DIG. 3
(58) Field of Search ...................... 96/134, 382; 55/337, 55/413, 414, 467, 482, 486, 489, DIG. 3; 15/353

(56) References Cited

U.S. PATENT DOCUMENTS

| | | |
|---|---|---|
| D178,199 S | 7/1956 | Martinec |
| 2,956,734 A | 10/1960 | Doyle |
| 4,179,768 A | 12/1979 | Sawyer |
| D258,064 S | 1/1981 | Pearman, Jr. |
| D260,151 S | 8/1981 | Martinec |
| 4,435,877 A | 3/1984 | Berfield |
| D287,895 S | 1/1987 | Berfield et al. |
| 5,248,323 A * | 9/1993 | Stevenson ..................... 95/90 |
| D357,336 S | 4/1995 | Moine et al. |
| D357,773 S | 4/1995 | Wareham et al. |
| D362,091 S | 9/1995 | Tomasiak et al. |
| D362,522 S | 9/1995 | Kohler |
| D372,567 S | 8/1996 | Moine et al. |

(Continued)

OTHER PUBLICATIONS

Product Sheet of Jji Kae Enterprise Co. Ltd., 3200W 3–in–1 Wet/Dry & Shampoo Vacuum Cleaner, Copyright 1998, p. 1.
Product Sheet of Shivn Feng Enterprise Co. Ltd., HF–3229 Multifunction Vacuum Cleaner—Wet and Dry, Copyright 1998, p. 1.
Product Sheet of Jji Kae Enterprise Co. Ltd., 3223W Wet/ Dry Vacuum Cleaner with 950W Power Consumption, Copyright 1998, p. 1.
Product Sheet of Jji Kae Enterprise Co. Ltd., 3208W Vacuum Cleaner with 14–Liter Drum Capacity, Copyright 1998, p. 1.
Product Sheet of Ningbo Fuda Electric Appliance Co. Ltd., ZL 1200–35 Vacuum Cleaner with Large Capacity Dust Bag, p. 1.
Product Sheet of Richyoung Industrial Co. Ltd., RY–A1014 Wet/Dry Vacuum Cleaner with a Tank Capacity of 15 Liters, p. 1.

(Continued)

*Primary Examiner*—Robert A. Hopkins
(74) *Attorney, Agent, or Firm*—R. Neil Sudol; Henry D. Coleman; William J. Sapone

(57) ABSTRACT

Disclosed is a vacuum cleaner which can remove sludge, bad smells and toxic gases and discharge the filtered air to the upper portion of the vacuum cleaner to prevent the filtered air from being sucked with non-filtered air into the cleaner again. The vacuum cleaner includes: a dust collector having a suction hole; a cleaner body sealably assembled on the upper portion of the dust collector; a handle hinged on the upper portion of the cleaner body; a filter assembly assembled inside the dust collector and having a disc filter located on the lower surface of the cleaner body, an activated carbon filtering part located under the disc filter and a cone type filtering part located under the activated carbon filtering part; and an air discharging unit assembled on the air discharging part of the cleaner body.

6 Claims, 5 Drawing Sheets

U.S. PATENT DOCUMENTS

| | | |
|---|---|---|
| D373,862 S | 9/1996 | Stephens et al. |
| 5,660,493 A | 8/1997 | Stephens |
| D383,264 S | 9/1997 | Balz |
| D383,575 S | 9/1997 | Griffin |
| D384,448 S | 9/1997 | Stephens et al. |
| D389,962 S | 1/1998 | Berfield et al. |
| D410,782 S | 6/1999 | Siemers |
| 6,010,550 A * | 1/2000 | Song ............................ 55/482 |
| D425,677 S | 5/2000 | Williamson |
| D430,712 S | 9/2000 | Song |
| D430,714 S | 9/2000 | Song |
| D437,464 S | 2/2001 | Song |
| D437,466 S | 2/2001 | Song |
| D439,709 S | 3/2001 | Song |

OTHER PUBLICATIONS

Product Sheet entitled Luft–u.Raumreinigungssystem, HYLA, p. 2, no date supplied.

Product Sheet of Align Machine Tool Co., Ltd., Wet/Dry Vacuum Cleaners, Inq. No., no date supplied.

Product Sheet of TMB SRL, Wet/Dry Vacuum Cleaners, Italy, no date supplied.

Product Sheet entitled Oilmist Fume, Vacuum Cleaners, no date supplied.

Product Sheet of Kyung Seo Co., Ltd., Vacuum Cleaners, no date supplied.

Product Sheet of Filter Queen, "An American Icon Since 1928", Majestic, p. 15, no date supplied.

"Hoover Displays Soft Guard, Hard Floor Machine", by Arthur Zaczkiewicz, Homeworld Business Floor Care, 1 Sheet, no date supplied.

Eureka Vacuum, "Less than one year out of the box, the WhirlWind is taking the market by storm." 1 sheet.

Advertisement of Bissell Vacuum Cleaner, "Things are Really Heating Up at Bissell", 1 sheet.

Advertisement, "The Bagless 1999 Vision", The Dirt Devil Swivel Glide Vision, 1 sheet, no date supplied.

Brochure, Cyvac Vacuum Cleaner, Conet Industries Inc., no date supplied.

Korean Advertisement, Vacuum Cleaners, Industrie Forum Design Hannover '98, 1 sheet, no date supplied.

Korean Advertisement, Vacuum Cleaners, no date supplied.

U.S. Trademark Registration No. 1,976,252, Registered May 28, 1996, Configuration of Vacuum Cleaner, Health–Mor, Inc.

* cited by examiner

[Fig.1]
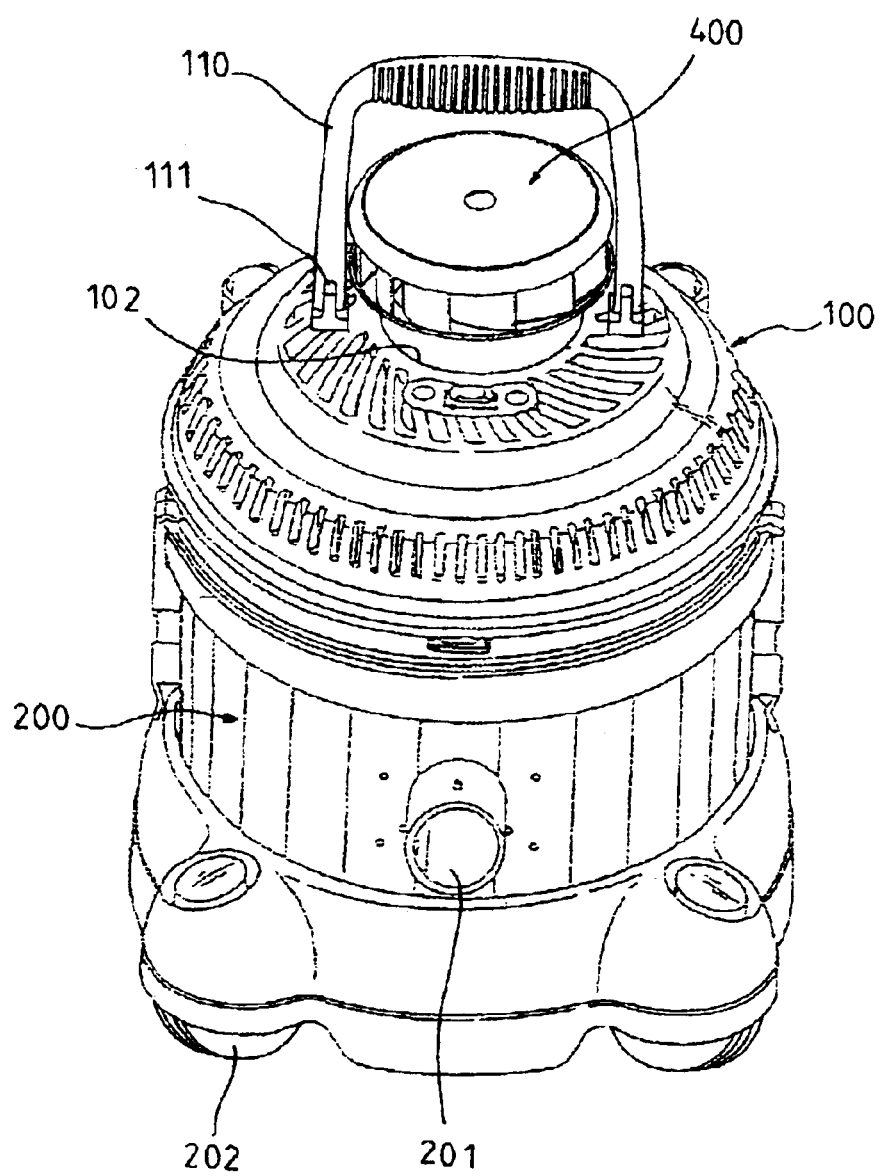

[Fig.2]
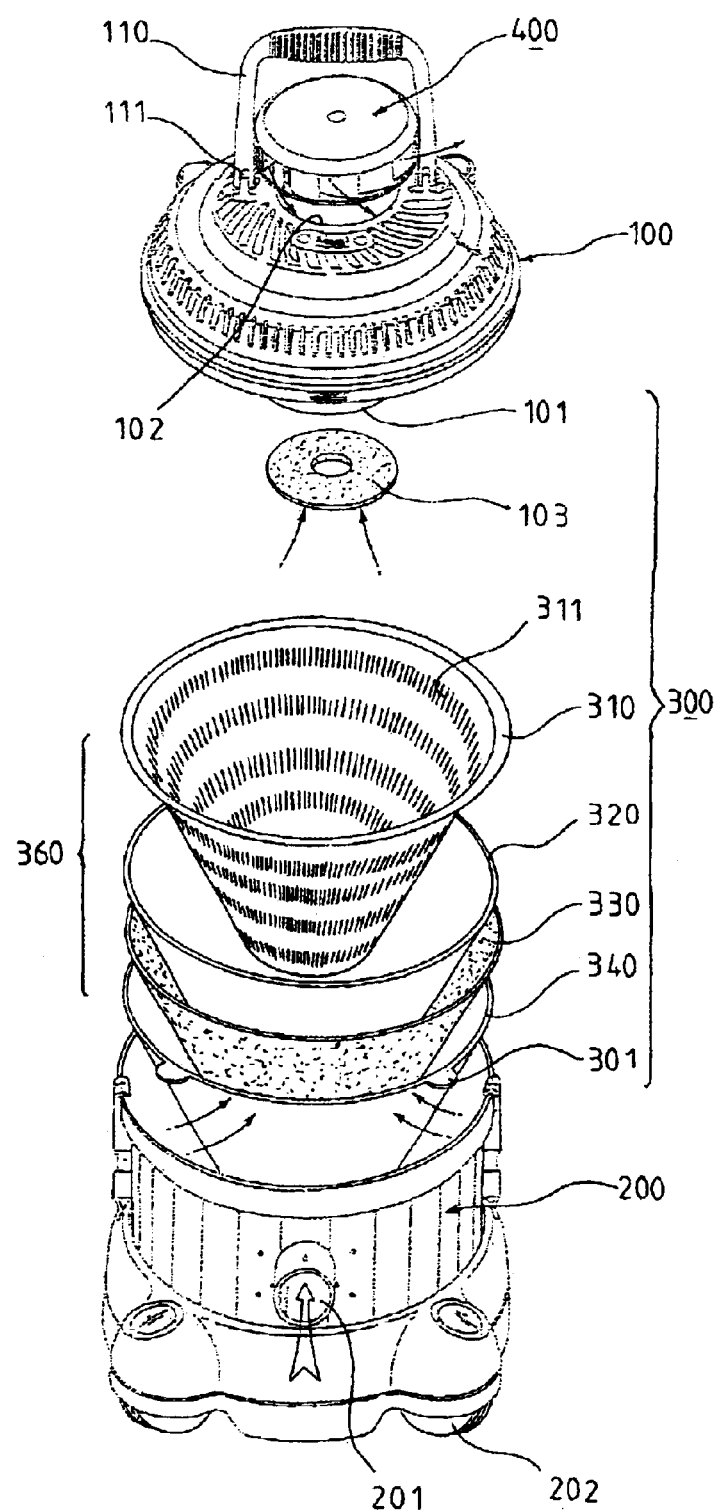

[Fig.3]
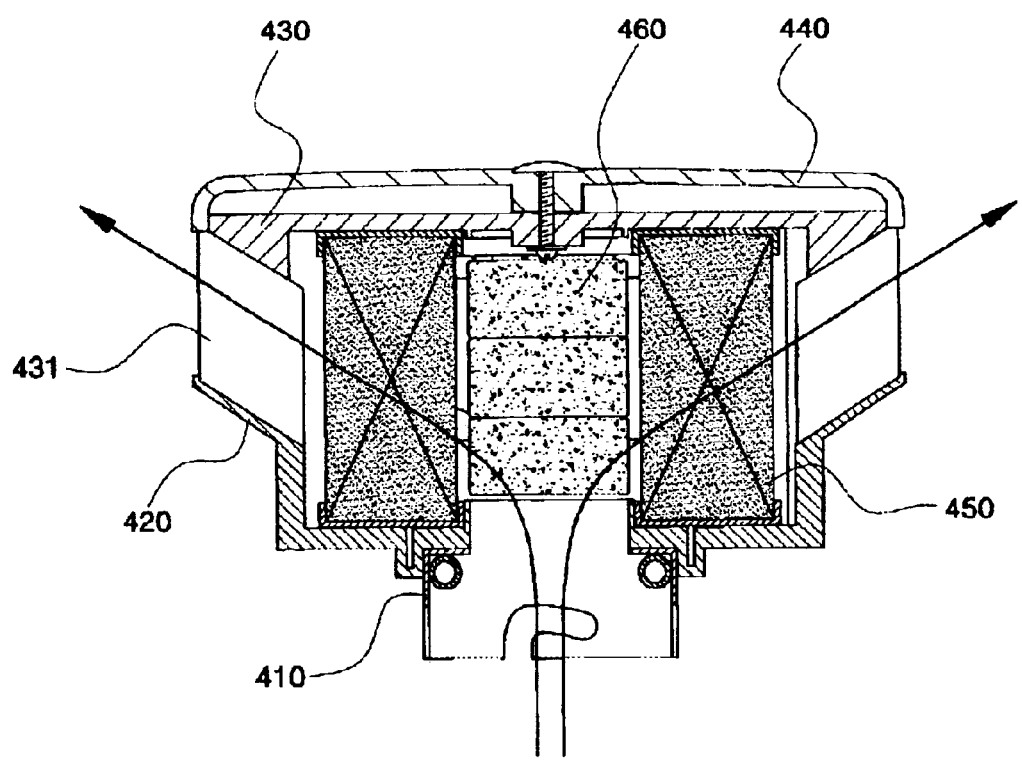

[Fig.4]
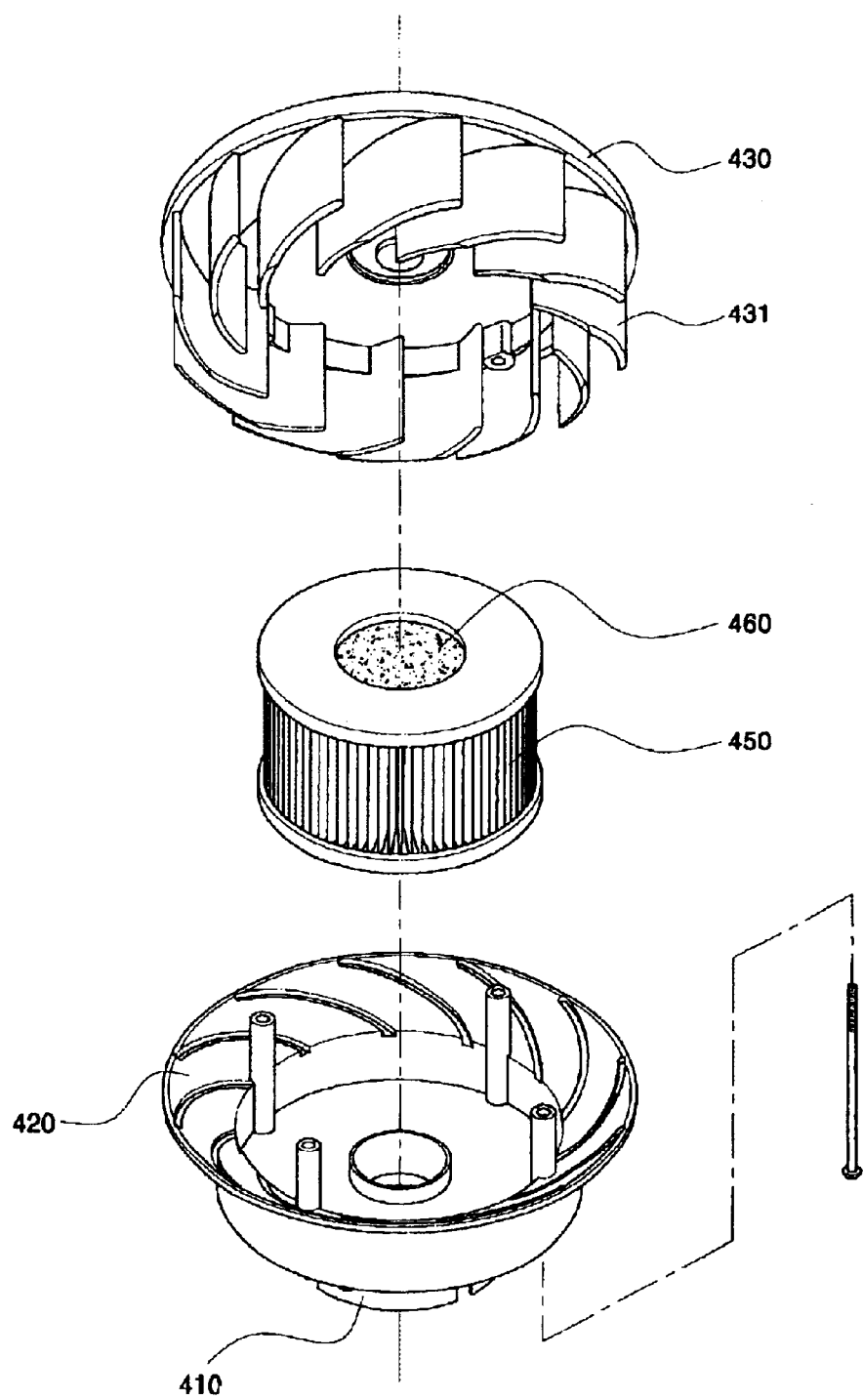

[Fig.5]
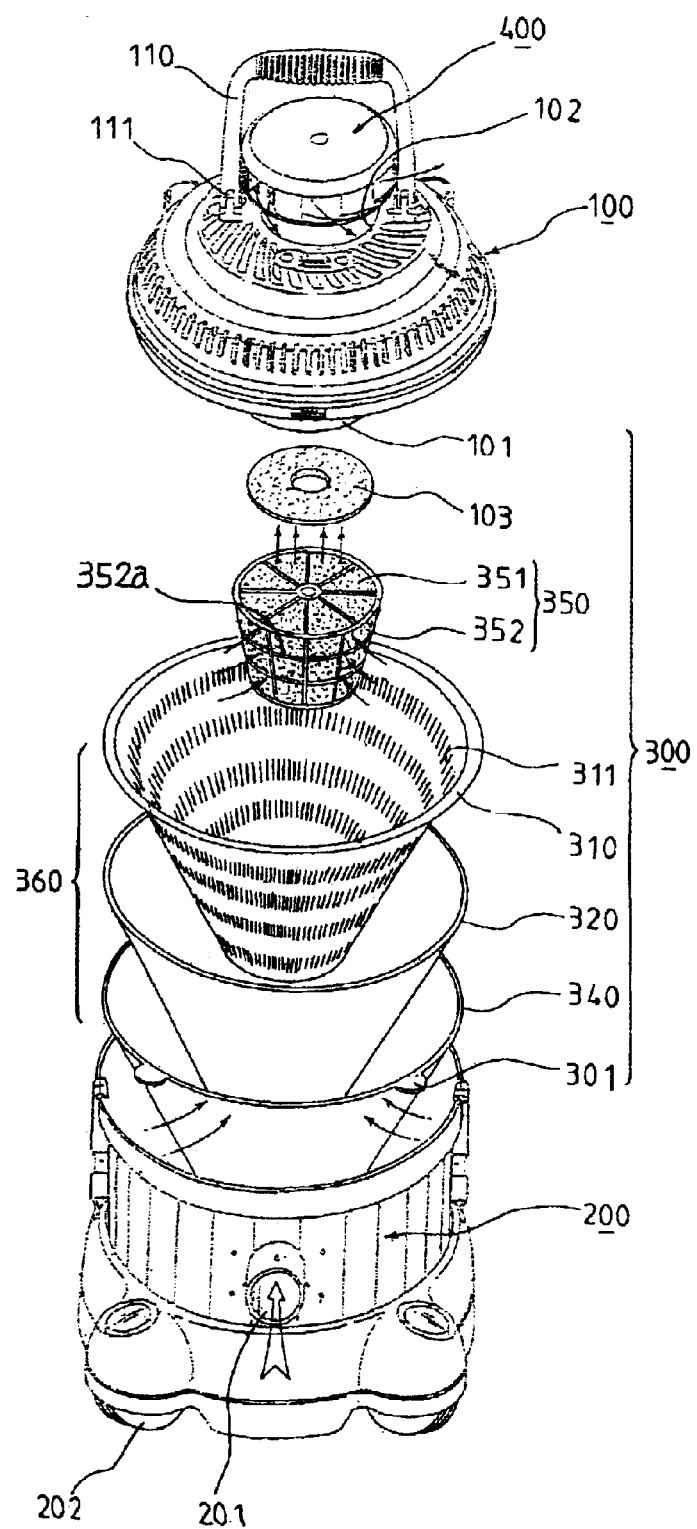

VACUUM CLEANER

BACKGROUND OF THE INVENTION

1. Field of the Invention

The present invention relates to a vacuum cleaner capable of easily cleaning the floor, carpets, chairs, and so on, in a vacuum suction method, and more particularly, to a vacuum cleaner, which has an activated charcoal filter in which activated carbon particles are impregnated, a filter for filtering dust, and a filter charged with static electricity, thereby removing sludge, bad smells, toxic gases generated from various indoor matters and easily diffusing the air, from which the sludge, bad smells and toxic gases are removed, to the whole upper part.

2. Background of the Related Art

In general, a conventional vacuum cleaner includes a motor for making a cleaner body into a vacuum, and an envelope type filter, and is operated in such a manner that the motor generates vacuum force to induce sludge into the cleaner body and the filter filters the sludge to remain dirt in the cleaner body and to discharge only the sludge and the air, which pass the filter, through an outlet mounted in the upper portion of the body.

Because the conventional filter mounted in the cleaner body is in the form of a mat having a simply porous net, it simply filters the sludge induced into the cleaner body by the vacuum force or is deteriorated in suction force as the porous net is stopped by the induced sludge. As a result, the conventional filter can filter the sludge of large particles induced into the cleaner but cannot remove gases or bad smells including fine dust.

Therefore, the conventional cleaner only collects and disposes garbage without removing pollutants and discharges the fine dust, gases and bad smells through the outlet when discharging the air after collecting the sludge, and thereby, it cannot prevent the air pollution. Furthermore, the conventional cleaner may cause a fire or an explosion by spark generated from the motor of the cleaner because it cannot purify combustible gas or toxic gas induced into the cleaner. So, it is difficult to use the cleaner in places where the combustible gas or toxic gas is generated, and the cleaner needs a purifier for removing the gases, dust and bad smells.

SUMMARY OF THE INVENTION

Accordingly, the present invention is directed to a vacuum cleaner that substantially obviates one or more problems due to limitations and disadvantages of the related art.

An object of the present invention is to provide a vacuum cleaner for easily cleaning the floor, carpets and chairs in a vacuum suction method, which can remove sludge, bad smells and toxic gases generated from various matters, such as gases and bad smells generated from an adhesive used on wallpaper or furniture, gases and smells generated from chemicals for building materials, carbon monoxide and carbon dioxide generated when cooking, exhaust gases of cars induced from the outside and which can discharge the filtered air to the upper portion of the vacuum cleaner to prevent the filtered air from being sucked with non-filtered air into the cleaner again. For this, the vacuum cleaner has an activated charcoal filter in which activated carbon particles are impregnated, a filter for filtering dust, and a filter charged with static electricity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a vacuum cleaner, which has a dust collector having a suction hole formed in the outer surface and a cleaner body sealably assembled on the upper part of the dust collector and adapted to suck the air induced from an inducing part of the lower surface and discharge the air to an air discharging part formed in the upper portion when a fan is operated to make the inside of the cleaner vacuous, includes: a filter assembly mounted on the lower surface of the cleaner body and having a disc filter fixed in the inducing part of the lower surface, a conical fixing frame mounted on the outer circumferential surface of the disc filter and having a number of suction holes formed in the whole surface, a static electricity filter mounted on the outer circumferential surface of the fixing frame, an activated charcoal filter mounted on the outer circumferential surface of the static electricity filter, and a dust removing filter mounted on the outer circumferential surface of the activated charcoal filter; an air discharging unit assembled on the air discharging part of the upper portion of the cleaner body and having a vertically cylindrical connecting part, a tray part extending in an upward direction of the connecting part and having a V-shaped section, a guide member mounted on the tray part and having a number of radial wings and a V-shaped bottom, and a cover assembled to the upper surface; and a ⊏-shaped handle rotatably mounted on the upper surface of the cleaner body by being connected between both side ends in such a manner that the handle does not interfere the operation of the air discharging unit.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a perspective view of a vacuum cleaner according to the present invention;

FIG. 2 is an exploded perspective view of the whole structure of the present invention;

FIG. 3 is a perspective view of a structure of an air discharging unit of the present invention;

FIG. 4 is a sectional view of the structure of the air discharging unit of the present invention; and FIG. 5 is an exploded perspective view of another embodiment of a filter assembly according to the present invention.

DETAILED DESCRIPTION OF THE PREFERRED EMBODIMENT

Reference will now be made in detail to the preferred embodiments of the present invention, examples of which are illustrated in the accompanying drawings.

FIG. 1 is a perspective view of a vacuum cleaner according to the present invention, FIG. 2 is an exploded perspective view of the whole structure of the present invention, FIG. 3 is a perspective view of a structure of an air discharging unit of the present invention, and FIG. 4 is a sectional view of the structure of the air discharging unit of the present invention.

As shown in FIGS. 1 and 2, the present invention includes a dust collector 200 and a cleaner body 100 located on the dust collector 200.

The dust collector 200 includes wheels 202 mounted on the lower surface for easily moving the vacuum cleaner and a suction hole 201 formed in the outer surface of the cylindrical dust collector 200 for connecting a hose.

The cleaner body 100 is mounted on the upper portion of the dust collector 200 and sealed with a sufficient airtightness. The cleaner body 100 sucks the air from an inducing part 101 of the lower surface of the cleaner body 100 and discharges it to an air discharging part 102 formed in the upper portion thereof when a fan (not shown) having a motor inside the cleaner body 100 is operated.

The filter assembly 300 is located on the lower surface of the cleaner body 100. The filter assembly 300 includes a disc filter 103 fixed in the inducing part 101 of the lower surface of the cleaner body 100, a conical fixing frame 310, in which the disc filter 103 is inserted and fixed, having suction holes 311 in the whole surface, a static electricity filter 320 mounted on the outer circumferential surface of the fixing frame 310, an activated charcoal filter 330 mounted on the outer circumferential surface of the static electricity filter 320, and a filter 340 for removing dust mounted on the outer circumferential surface of the activated charcoal filter.

The activated charcoal filter 330 and the dust removing filter 340 of the filter assembly 300 have a number of wings 301 formed on the upper ends thereof, and the wings 301 serve to stably mount the filters and make a user to check the mounted condition of the filters.

Alternatively, as shown in FIG. 5, the filter assembly 300 may have the follow structure.

That is, the filter assembly 300 located on the lower surface of the cleaner body 100 includes the disc filter 103 fixed on the inducing part 101 formed in the lower surface of the cleaner body 100, an activated charcoal filtering part 350 assembled on the lower surface of the disc filter 103 and having a cartridge type container 352 formed in such a manner that activated carbon surrounds a filter pouch 351, and a cone type filtering part 360 having the conical fixing frame 310 fixed on the lower surface of the cleaner body 100 and having the suction holes 311 formed in the whole surface, the static electricity filter 320 mounted on the outer circumferential surface of the fixing frame 310, and the filter 340 for removing dust mounted on the outer circumferential surface of the static electricity filter.

The filter pouch 351 of the activated charcoal filtering part 350 is made of nonwoven fabric, paper, textile fabric, or non-tissue polyester, and the cartridge type container 352 is made by a lattice type frame 352a to expose the filter pouch 351 as much as possible.

The air discharging unit 400 is assembled on the upper discharging part 102 of the cleaner body 100, and includes a vertically cylindrical connecting part 410, a tray part 420 extending in the upward direction of the connecting part 410 and having a V-shaped section, a number of wings 431 formed on the tray part 420, a guide member 430 having a V-shaped bottom, and a cover 440 assembled on the upper portion.

At this time, the air discharging unit 400 has a corrugated cylindrical air filter 450 therein, and the vertically cylindrical connecting part 410 has a noise filtering sponge 460 therein.

At this time, it is preferable that the noise filtering sponge 460 is a filter containing activated carbon. The air finally filtered by the air filter 450 is discharged.

The handle 110 is rotatably mounted on the upper surface of the cleaner body 100 and connected between both side ends 111 of the upper surface of the cleaner body 100. Additionally, the handle 110 is located so high as the handle 110 does not interfere the operation of the air discharging unit 400 in consideration of the size of the air discharging unit 400.

As shown in FIG. 1, in the filter assembly 300, the static electricity filter 320, which is charged with static electricity, the activated charcoal filter 330, which is made of nonwoven fabric, filtering paper or textile fabric and in which activated carbon is impregnated, and the dusting removing filter 340, which is mounted on the outer circumferential surface of the filter 330 in such a manner to surround the filter 330, are assembled and formed in the conical shape. After that, the disc filter 103 is mounted in the inducing part 101 formed in the middle of the bottom surface of the cleaner body 100, and then, the fixing frame 310 having the plural suction holes 311 is mounted. The filter assembly 300 having the static electricity filter 320, the activated charcoal filter 330 and the dust removing filter 340 is assembled on the outer circumferential surface of the fixing frame 310.

In a condition that the filter assembly 300 is mounted inside the cleaner body, when the motor of the cleaner body 100 is operated, a various kinds of sludge and gases are sucked into the dust collector 200 through the suction hole 201 and rotated at a high speed thereby isolating and collecting most of the sludge to the wall surface and the floor of the dust collector by centrifugal force, and first filtering a small amount of the sludge and gases by the dust removing filter 340, and then removing the dust and sludge. Finally, a micron unit of the dust, bad smells and gases passing the filter 340 are completely filtered while passing the activated charcoal filter 330 or the activated carbon filtering part 350 and the static electricity filter 320. The dust, smells and gases except the pure air are all filtered through the filter assembly 300.

Therefore, only the pure air passing the filters is discharged through the air discharging unit 400 of the cleaner body 100. Accordingly, the present vacuum cleaner provides not only the cleaning function but also a purifying function. Moreover, the static electricity filter 320 and the disc filter 103 can prevent a spark generated from an activated carbon by absorbing the activated carbon using static electricity when the activated carbon is scattered, thereby preventing a fire or an explosion.

Meanwhile, the pure air discharged to the air discharging unit 400 passes the vertically cylindrical connecting part 410 of the air discharging unit 400 and is discharged through the radial wings 431 formed between the tray part 420 having the V-shaped section and the cover 440. At this time, the tray part 420 and the guide member 430 induce and diffuse the air in the upward direction because they have upward inclinations, i.e., the V-shaped sections as shown in FIGS. 3 and 4.

Therefore, the vacuum cleaner according to the present invention can prevent the purified air from being induced into the suction hole 201 of the dust collector 200 again.

As described above, because the present invention has the filter assembly 300 having the activated charcoal filter 330 in which activated carbon is impregnated, the cone type filter part 360 having the dust removing filter 340 and the static electricity filter 320 charged with static electricity, the vacuum cleaner can filter various kinds of the sludge sucked into the dust collector 200 of the cleaner through the filters. Furthermore, during the filtering, the cleaner can discharge only the pure air while removing various gases and smells included in the sucked materials.

Especially, because the air is finally purified through the air discharging unit 400, which is assembled on the upper part of the cleaner body 100, and discharged to the upper portion of the cleaner, the cleaner can clean well, remove various indoor bad smells and toxic gases, make the user to stably mount the filters, and prevent the purified air from being induced into the suction hole of the dust collector again.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A vacuum cleaner comprising:
    a dust collector having a suction hole formed in the outer circumferential surface thereof;
    a cleaner body sealably assembled on the upper portion of the dust collector, the cleaner body having an air inducing part formed in the middle of the bottom surface thereof, an air discharging part formed in the middle of the top surface thereof, a fan mounted inside the air discharging part and a motor for operating the fan;
    a handle hinged on the upper portion of the cleaner body;
    a filter assembly assembled inside the dust collector, the filter assembly having a disc filter located on the lower surface of the cleaner body, an activated carbon filtering part located under the disc filter and a cone type filtering part located under the activated carbon filtering part; and
    an air discharging unit assembled on the air discharging part of the cleaner body,
    the air discharging unit including a vertically cylindrical connecting part, a tray part extending in an upward direction of the cleaner body and having a V-shaped section, a guide member mounted on the upper portion, the guide member having a number of radial wings and a V-shaped bottom, and a cover.

2. The vacuum cleaner according to claim 1, wherein the activated carbon filtering part of the filter assembly includes a filter pouch surrounding activated carbon and a cartridge type container having the filter pouch therein.

3. The vacuum cleaner according to claim 2, wherein the filter pouch of the activated carbon filtering part is made of nonwoven fabric, paper, textile fabric or non-tissue polyester.

4. The vacuum cleaner according to claim 2, wherein the cartridge type container of the activated carbon filtering part has a lattice type frame to expose the filter pouch as much as possible.

5. The vacuum cleaner according to claim 1, wherein the cone type filtering part of the filter assembly includes a conical fixing frame having a number of suction holes formed in the whole surface, a static electricity filter mounted on the outer circumferential surface of the fixing frame, and a dust removing filter mounted on the outer circumferential surface of the static electricity filter.

6. The vacuum cleaner according to claim 1, wherein the air-discharging unit includes a noise filtering sponge disposed in the middle portion inside the air discharging unit, and an air filter surrounding the circumference.

* * * * *